United States Patent [19]

Omdal et al.

[11] 3,948,443
[45] Apr. 6, 1976

[54] METHOD AND APPARATUS FOR SPREADING GRANULAR MATERIAL, ESPECIALLY FERTILIZER

[75] Inventors: Bjarne Omdal, Porsgrunn; Johs. Skaadel, Skien, both of Norway

[73] Assignee: Norsk Hydro a.s, Oslo, Norway

[22] Filed: Nov. 25, 1974

[21] Appl. No.: 527,148

[30] Foreign Application Priority Data
Nov. 26, 1973 Norway................................ 4499/73

[52] U.S. Cl................................. 239/8; 239/654
[51] Int. Cl.² A01N 17/02; A62C 1/12; A01C 3/06; A01C 15/04
[58] Field of Search............... 239/654, 655, 659, 8; 214/83.28; 222/193, 194

[56] References Cited
UNITED STATES PATENTS

| 1,253,672 | 1/1918 | Decker | 239/654 |
|---|---|---|---|
| 1,808,654 | 6/1931 | Hagens | 239/654 |
| 2,226,136 | 12/1940 | Parker | 239/655 |
| 2,842,897 | 7/1958 | Finn | 239/654 |
| 2,844,914 | 7/1958 | Finn | 239/654 |
| 3,015,188 | 1/1962 | Reinecker et al. | 239/654 |
| 3,123,362 | 3/1964 | Elvers, Sr. | 239/654 |
| 3,304,647 | 2/1967 | Szekely | 239/654 |

*Primary Examiner*—Lloyd L. King
*Attorney, Agent, or Firm*—Wenderoth, Lind & Ponack

[57] ABSTRACT

Granular material, such as a fertilizer, is continuously or intermittently fed into one or several launching tubes and compressed air pulses are introduced at regular time intervals behind each quantity which at any time has been fed into the tube(s), so that part quantities of the material are shot out at a certain rate and over a certain range.

17 Claims, 5 Drawing Figures

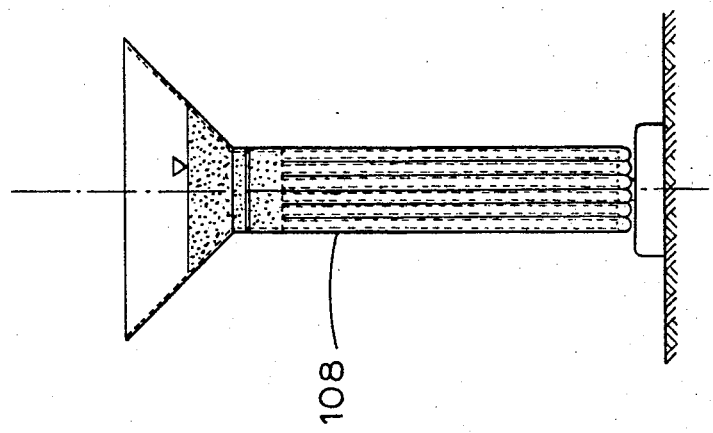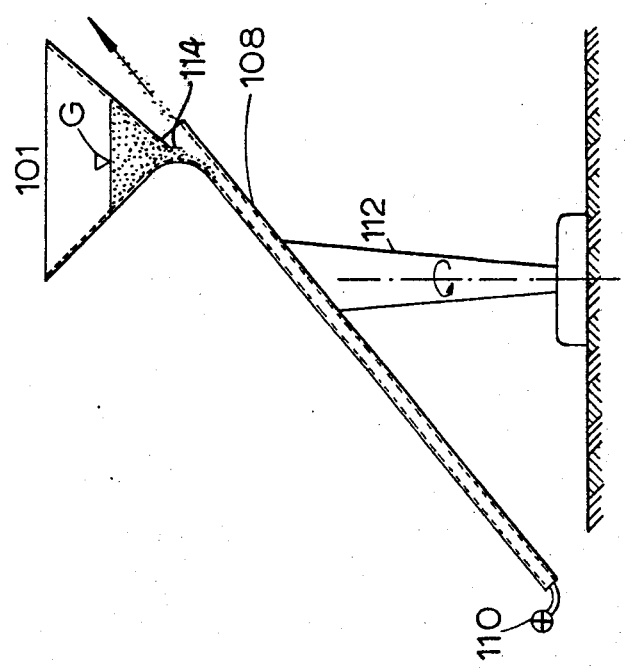

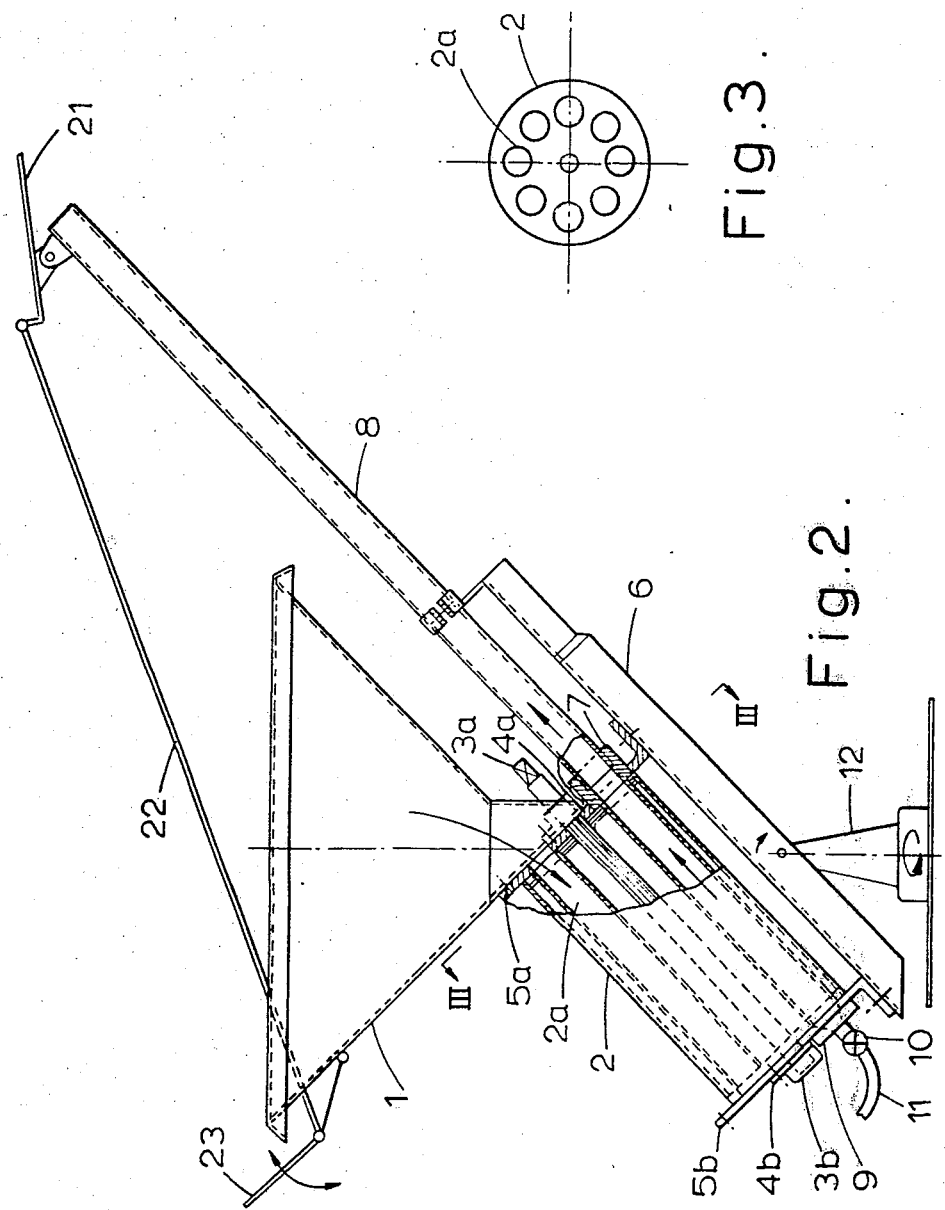

METHOD AND APPARATUS FOR SPREADING GRANULAR MATERIAL, ESPECIALLY FERTILIZER

BACKGROUND OF THE INVENTION

This invention relates to a method and an apparatus for spreading granular material, especially a fertilizer.

The invention is especially intended for use in connection with fertilization of rock banks, road slopes and cuttings and other hardly accessible areas which cannot be reached by conventional spreading apparatus.

In conventional spreaders the fertilizer is dosed continuously to centrifugal blades, pendulum tubes and the like, which accelerate the material to a higher velocity. However, these spreaders have a very limited spreading range and they are generally intended for fertilizing easily accessible areas, such as an agricultural area.

There is also known a spreading apparatus in which the fertilizer is accelerated and transported by feeding into a continuous air stream, e.g. from a fan or a compressor. The fertilizer then aquires a spreading velocity which at best almost corresponds to the velocity of the air stream. By these means is obtained a spreading range which is wider than that of the abovementioned conventional spreaders. However, in most cases none of these air based spreading devices have a sufficient range to cover in a satisfactory manner such hardly accessible areas as mentioned above. Further, it is often desireable in such cases to be able place the fertilizer onto selected areas of relatively limited extent, which is hardly possible with most of the known mechanical types of spreaders.

SUMMARY OF THE INVENTION

Thus an object of the present invention is to arrive at a new method and a new apparatus for spreading a fertilizer, by which a substantially wider spreading range may be obtained than by hitherto known spreading apparatus, and by which control of the fertilizer spreading operation can be effected so that the impact area of the fertilizer may be controlled with relatively high degree of precision.

According to the invention there is provided a method wherein the fertilizer is fed into a tube shaped spreading means and is driven out thereof by means of compressed air, and the novel and specific feature of the invention resides in the fact that the compressed air is introduced intermittently, in the form of separate, individual pulses, behind a fertilizer quantity which previously at any time has been fed into the tube means, whereby part quantities of the fertilizer are shot out of the tube.

The launching tube or barrel may be rotatably and/or tiltably supported, so that it is possible to aim at a selected impact area for the fertilizer. In order to provide further control the barrel may be provided with a flexible end portion, and with an adjustable flap at the muzzle.

Admittedly it is well known to utilize a pulsating or undulating air stream when conveying particulate material in pipes, e.g. in connection with the above discussed known spreading apparatus. However, also in this case the air stream is continuous, the air pressure oscillating about a mean value. The reason for using such pressure variation is to prevent the particulate material from sticking to and thus accumulating along the tube wall. The separate air pulses or doses utilized in the present invention can therefore not at all be compared to the known air pulsating principle, and it will readily be understood that the spreading apparatus according to this invention in reality is a gun in which compressed air is used as drive charge for the individual fertilizer part quantities.

By the method and apparatus according to the invention it is possible, at an air pressure of 7 – 8 $kg/cm^2$, to obtain ranges of 30 – 40 m with common granular or prilled commercial fertilizer and 50 – 60 m with a coarser fertilizer. These are substantially wider ranges than those which known spreaders can perform, and in most cases it is sufficient to solve the problem connected with fertilizing hardly accessible areas of the previously mentioned type. Even though the invention is especially intended for use in connection with such areas, it will be understood that it is also well suited for other fertilizing purposes, such as fertilizing cultivated pasture or steep difficult cultivation areas. By programmed control of the movements of the barrel a uniform automatic spreading of the fertilizer may be obtained, so that the spreader according to the invention also will be suited for fertilizing common agricultural areas, particularly such cultivation where driving in the field causes damage.

BRIEF DESCRIPTION OF THE DRAWINGS

The invention will now be explained in detail in connection with the accompaning drawings, which diagrammatically illustrate various embodiments of the invention.

FIG. 1a and 1b diagrammatically are a side view and an end view respectively of an embodiment of the invention.

FIG. 2 is an elevational view of a second embodiment of the invention shown partly in section.

FIG. 3 is an endview of the feeding device of the embodiment shown in FIG. 2, as seen along the line III—III in FIG. 2.

DETAILED DESCRIPTION OF THE INVENTION

Figure 4:
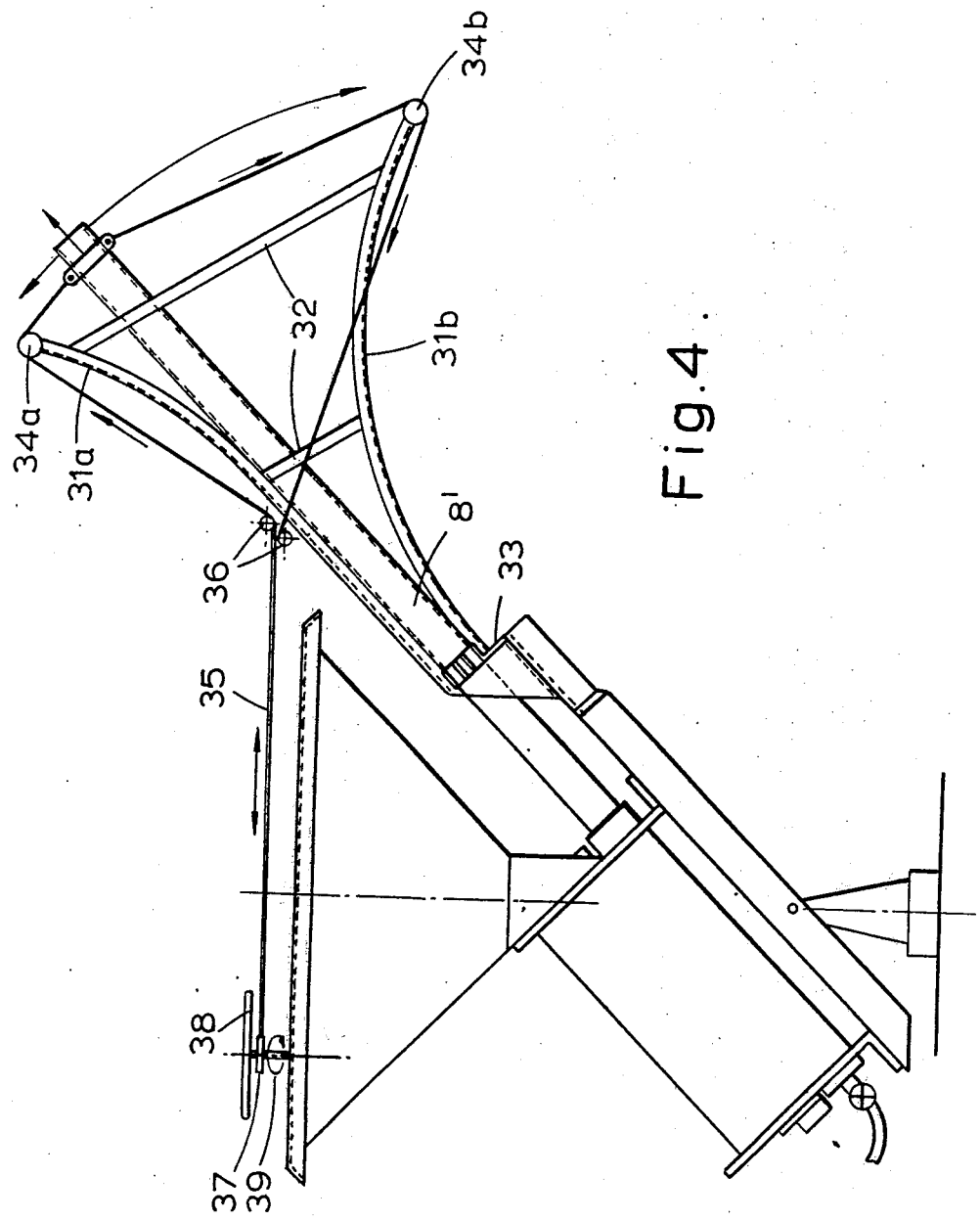
FIG. 4 shows a modification of the embodiment of FIG. 1.

In FIG. 1 the number 108 denotes a number of parallelly and adjacently arranged, rigid tubes, e.g. six tubes, which are mounted with fixed or adjustable inclination on a rotatable base 112. The lower end of each tube is connected to a valve 110 adopted for introducing compressed air into the bottom ends of the tubes 108, from a compressed air tank (not shown) in short programmed pulses. In the upper end portion of the tubes 108 near their muzzles a feeding hopper 101 is arranged from which fertilizer G may flow into the tubes 108 through respective openings in the upper portion thereof. The fertilizer feed may be controlled by means of a flap 114 in the bottom of the hopper. In operation the fertilizer G in the hopper continuously flows into the tubes and falls to the bottom thereof. At uniform time intervals a compressed air pulse is admitted into the bottom ends of the tubes, so that the fertilizer quantity which has accumulated during each time interval, is driven or shot out of the tubes owing to the expansion of the compressed air. The firing may occur separately, successively for each tube and the range may be varied by continuously adjusting the air-pressure and/or the duration of the air pulses. This embodiment of the invention provides a particularly simple and rugged construction, making it possible to control the size of each charge, as the rate of fire may be adjusted continuously from a control panel.

In FIG. 2 is illustrated an alternative embodiment of the invention. From a hopper 1 the fertilizer, as indicated by an arrow, flows through an opening in a front plate 5a of the spreader into a series of spaced apart tube cells 2a in a feeding device 2. As best shown in FIG. 3 the latter is similar to the revolving cylinder of a revolver. Welded to the cell-feeder 2 are journals 3a and 3b which rotates in bearings having housings 4a and 4b, supported on the front plate 5a and a rear plate 5b of the spreader. These plates are in turn mounted on the body 6 and are also held in position by means of stay bolts with nuts, which are not shown on the figure.

The cell-feeder 2 is rotated in steps by means of a ratchet (not shown) engaging the square end of the journal 3a. The ratchet is again moved by means of an air cylinder which is not shown in the figure. In the front plate 5a is mounted a sleeve 7 having labyrinth packing against the front end of the cell-feeder. The outlet tube or barrel 8 for the fertilizer is mounted in the sleeve 7. In the rear plate 5b is mounted another sleeve 9 having labyrinth packing against the rear end of the cell-feeder. On the sleeve 9 is mounted an air valve 10 and a conduit 11 adapted to introduce compressed air into the bottom end of the tube 8 from an air tank, as previously explained in connection with FIG. 1.

The drive means for the cell-feeder 2 (ratchet/air cylinder) rotates the feeder in steps with a stance each time a cell filled with fertilizer aligns with the sleeves 7 and 9 in the front and rear plate. Each time the cell-feeder stops, i.e. during the return movement of the ratchet, a short air pulse is admitted through the valve 10, such that the fertilizer charge is driven or shot out through the barrel 8. In the next step the cell-feeder is rotated or advanced one step, such that a new loaded cell is brought into "firing position" concurrently with an empty cell being loaded with fertilizer flowing from the hopper 1.

The advancing of the cell-feeder 2 and the firing are preferably controlled by means of a program work in which the firing rate and the duration of the air impulses may be continuously adjusted. The rate of firing may also be controlled in this manner, or by controlling the air pressure. In order to secure a good spreading for short ranges the barrel 8 may be provided with a deflector plate 21 which, by means of a string or link arrangement 22 and a lever 23 pivotably mounted to the hopper 1, may be turned into position in front of the muzzle in order to shorten the shooting range and simultaneously increase the lateral spreading.

In FIG. 4 is shown a modified embodiment of the spreader illustrated in FIG. 2, in which the barrel 8 is provided with a flexible outer part 8' which may be produced from polyethylene and the like. Longitudinally above and below the flexible tube part there are arranged an upwardly curved rigid arm 31a and a downwardly curved rigid arm 31b respectively which are spaced apart by stays 32. The arms 31a and b are fixed to the body 6 at their inner ends through a bracket 33. Supported in the outer ends of arms 31a and b are pulleys 34a and 34b, for supporting a chain 35 the opposite ends of which are attached to the tube part 8', near the muzzle thereof. The chain 35 extends via further pulleys 36 over a sprocket 37 which, together with a drive wheel or hand wheel 38, is keyed to a shaft 39 which is rotatably supported, for instance on the hopper 1. By turning the drive or hand wheel 38 in opposite directions the tube muzzle is pulled by the chain 35 alternatively upwards or downwards toward the curved arms 31a or 31b respectively.

By this arrangement the range and the area of spreading may be adjusted during operation, as the tube may be bended down into an arc, thus making it possible to shoot horizontally or even lower, e.g. when fertilizing dumps, without having to change the elevation of the gun which might disturb the function of the cell-feeder.

Normally compressed air for operation of the spreader will be provided by a portable compressor driven by an internal combustion engine which, together with the spreading apparatus auxiliary equipment such as a pressure tank, may be mounted on a separate spreader vehicle or mounted on a truck, tractor or the like.

Tests have shown that a suitable inner diametre or caliber of the barrel is about 50 mm for a barrel length of about 1,5 m. Further it has proved practical to use individual fertilizer charges of about 1 kg and a firing rate of about 1 shot per second, at an air pressure of 7 – 8 atm. Preferably control of the advancing and firing operations is performed by means of a purely pneumatic control circuit, however, this circuit may also be electrical. In order to avoid excessive inertia forces the rate at which a cell-feeder may be advanced is limited, but the capacity of the spreader may be increased by providing several tubes 8 which are fired simultaneously or alternately, and the cell-feeder may be equipped with several rows of tube formed cells mounted in concentric circles. When using several tubes or barrels these may be equipped for different range and spreading.

To obtain an improved air economy an arrangement may be employed in which the duration of the air pulses is somewhat longer when the spreader is shooting transversely of the direction of movement, while the air consumption is reduced when shooting more or less rearward, when maximum range is not necessary.

Common for all the above described and shown embodiments of the device according to the invention is that the initiation and duration of the various operations and movements may be controlled by means of a program work.

We claim:

1. A method for spreading a granular material, particularly fertilizer, said method comprising:
    feeding separate quantities of granular material into tube means; and
    intermittently introducing into said tube means, behind each said quantity of material, separate individual pulses of compressed air, and individually shooting each said quantity of material out of said tube means.

2. A method as claimed in claim 1, wherein said tube means includes separate tube cells, and said separate pulses are introduced into each of said tube cells.

3. A method as claimed in claim 2, wherein said separate pulses are introduced sequentially into said separate tube cells.

4. A method as claimed in claim 1, further comprising controlling the range of said shooting by adjusting the duration of said pulses.

5. A method as claimed in claim 1, further comprising controlling the range of said shooting by adjusting the air pressure of said pulses.

6. A method as claimd in claim 1, further comprising program controlling the range and area of said shooting.

7. An apparatus for spreading a granular material, particularly fertilizer, said apparatus comprising:
an adjustably positioned tube means;
means for feeding into said tube means separate quantities of granular material; and
means for intermittently introducing into said tube means, behind each said quantity of material, separate individual pulses of compressed air and for individually shooting each said quantity of material out of said tube means.

8. An apparatus as claimed in claim 7, wherein said tube means includes a plurality of separate tube cells, into each of which are fed a separate said quantity of material.

9. An apparatus as claimed in claim 8, wherein said tube means further includes an outlet tube, said separate tube cells being successively communicable with said outlet tube.

10. An apparatus as claimed in claim 9, wherein said separate tube cells are mounted in a rotatable feeding means operable for successively moving said tube cells into alignment with said outlet tube.

11. An apparatus as claimed in claim 10, wherein said tube cells are mounted in said rotatable feeding means in plural concentric circles.

12. An apparatus as claimed in claim 8, wherein said separate tube cells each have connected thereto air introduction means for simultaneously introducing pulses into separate of said tube cells.

13. An apparatus as claimed in claim 12, wherein individual of said tube cells are positioned for achieving spreading of said material quantities over different areas and ranges.

14. An apparatus as claimed in claim 8, wherein said separate tube cells each have connected thereto air introduction means for alternately introducing pulses into separate of said tube cells.

15. An apparatus as claimed in claim 14, wherein individual of said tube cells are positioned for achieving spreading of said material quantities over different areas and ranges.

16. An apparatus as claimed in claim 7, wherein the discharge end of said tube means is formed of a flexible material.

17. An apparatus as claimed in claim 7, further comprising a deflector plate mounted to be swung into a position in front of the muzzle of said tube means.

* * * * *